United States Patent [19]
Ichihara et al.

[11] Patent Number: 4,892,136
[45] Date of Patent: Jan. 9, 1990

[54] HEAT EXCHANGER

[75] Inventors: Takayuki Ichihara, Tokyo; Takeji Yogo; Masuhito Iinuma, both of Sakado; Eriya Arita, Kawagoe; Haruo Yokoo, Iruma, all of Japan

[73] Assignee: Kabushiki Kaisha Tsuchiya Seisakusho, Tokyo, Japan

[21] Appl. No.: 139,842

[22] Filed: Dec. 30, 1987

[30] Foreign Application Priority Data

| Dec. 31, 1986 | [JP] | Japan | 61-199103[U] |
| Dec. 31, 1986 | [JP] | Japan | 61-199104[U] |
| Dec. 31, 1986 | [JP] | Japan | 61-199106[U] |
| Jun. 30, 1987 | [JP] | Japan | 62-100884[U] |
| Jun. 30, 1987 | [JP] | Japan | 62-100880[U] |

[51] Int. Cl.$^4$ .................... F28F 13/12; F28F 19/00
[52] U.S. Cl. .................... 165/51; 165/119; 165/167; 165/174; 165/916; 123/196 AB; 123/41.33; 210/186
[58] Field of Search ............ 165/167, 916, 81, 119, 165/174; 123/196 AB, 41.33; 210/186

[56] References Cited

U.S. PATENT DOCUMENTS

| 1,325,637 | 12/1919 | Harrison | 165/167 |
| 1,874,054 | 8/1932 | Levinson | 165/916 |
| 1,916,768 | 7/1933 | Melcher | 165/916 |
| 2,528,013 | 10/1950 | Morris | 165/167 |
| 2,596,589 | 5/1952 | Nusbaum | 165/119 |
| 2,677,531 | 5/1954 | Hock, Sr. et al. | |
| 3,568,765 | 3/1971 | Konrad | 165/166 |
| 3,743,011 | 7/1973 | Frost | 165/38 |
| 4,669,532 | 6/1987 | Tejima et al. | 165/167 |
| 4,708,199 | 11/1987 | Yogo et al. | 165/167 |

FOREIGN PATENT DOCUMENTS

| 1920288 | 6/1970 | Fed. Rep. of Germany |
| 59-28219 | 8/1984 | Japan |
| 61-144379 | 9/1986 | Japan |
| 61-223213 | 10/1986 | Japan |
| 62-29583 | 2/1987 | Japan |
| 62-45585 | 3/1987 | Japan |
| 62-125870 | 8/1987 | Japan |
| 1062529 | 3/1967 | United Kingdom |
| 2107845 | 5/1983 | United Kingdom | 165/167 |
| 2140908 | 12/1984 | United Kingdom |
| 2163967 | 3/1986 | United Kingdom |

Primary Examiner—John Ford
Attorney, Agent, or Firm—Foley & Lardner, Schwartz, Jeffery, Schwaab, Mack, Blumenthal & Evans

[57] ABSTRACT

An automotive oil cooler used in combination with an oil filter. The oil cooler is comprised of a heat exchange element which is constructed of a plurality of heat transmission plates. The heat transmission plates are piled up one upon another and fixedly secured by brazing in such a manner as to define oil and water flowing spaces on the opposite sides of each heat transmission plate. Oil and water flow through the oil and water flowing spaces, respectively. The heat exchange element is formed with a plurality of oil supply passages through which oil is supplied to the oil filter, an oil inflow passage communicating with the oil flowing space to receive oil from the oil filter, an oil outflow passage communicating with the oil flowing space to receive oil from the oil flowing space, a water inflow passage communicating with the water flowing passage, and a water outflow passage communicating with the water flowing space to receive water from the water flowing space. Additionally, an under cover is fixedly secured to the heat exchange element and formed therein with a plurality of vertically extending partition walls. The partition walls define an oil supply chamber through which oil is supplied to the oil supply passage of the heat exchange element, an oil discharge chamber through which oil from the oil outflow passage of the heat exchange element is discharged outside of the under cover, a water introduction chamber through which water is introduced into the water inflow passage of the heat exchange element, and a water discharge chamber through which water from the water outflow passage of the heat exchange element is discharged outside of the under cover.

16 Claims, 20 Drawing Sheets

HEAT EXCHANGER

BACKGROUND OF THE INVENTION

1. Field of the Invention

The present invention relates generally to a plate type heat exchanger for two different fluids, and more particularly to a so-called housing-less type automotive heat exchanger or oil cooler usable in combination with an oil filter.

2. Description of the Prior Art

Hitherto it is well known that a variety of plate type heat exchangers have been widely used to cool oil such as lubricating oil in automotive vehicles. Of these, the so-called housing-provided type are extensively used in which a heat exchange element is constructed of a plurality of heat exchange units each formed of two heat transmission plates which are combined, with each other. Oil flows through an oil flowing space defined between the two heat transmission plates. The thus constructed heat exchanger element is disposed within a housing in such a manner as to define a coolant flowing space between the housing inner wall and heat exchange units. Such housing-provided type heat exchanger is complicated in construction and requires many production steps for production of the same, thereby raising production cost of the heat exchanger.

In view of the above, so-called housing-less type heat exchangers have been proposed and put into practical use in order to omit a housing as disclosed, for example, in Japanese Utility Model Publication No. 59-28219. Such a housing-less heat exchanger disclosed in the Publication is constructed of a plurality of heat transmission plates piled up one upon another. Adjacent heat transmission plates are fixed to each other by brazing in order to define an oil flowing space and a water flowing space on the opposite sides of each heat transmission plate. In this housing-less type heat exchanger, each heat transmission plate is formed with oppositely located outwardly projecting sections so that coolant introduction and discharge passages are formed respectively through the projecting sections of each heat transmission plate. Additionally, inlet and outlet pipes are connected to the heat exchanger so as to communicate respectively with the coolant introduction and discharge passages. The water inlet and outlet pipes extend upwardly to supply coolant into and discharge coolant from the heat exchanger. Thus, since the heat exchanger is not provided with a housing, it is simplified in construction and in production is facilitated.

However, the following difficulties have been encountered in such a housing-less type exchanger: Each heat transmission plate is irregular or complicated in profile, and therefore caulking or bending and brazing of the peripheral sections of the adjacent heat transmission plates are difficult, resulting in oil and/or coolant leaking. The heat exchanger is unavoidably provided at its side with two rows of oppositely protruding vertical projections corresponding to the above-mentioned outwardly projecting sections of each heat transmission plate. These vertical projections make it impossible to mount the heat exchanger on an automotive vehicle having limited engine compartment space. Additionally, when mounting an oil filter on the heat exchanger, tools are required to attach the oil filter or detach the same from the heat exchanger, in which the tools unavoidably interfere with the upwardly extending coolant inlet and outlet pipes.

SUMMARY OF THE INVENTION

A heat exchanger of the present invention is comprised of a heat exchange element including a plurality of heat transmission plates disposed one upon another. The heat transmission plates are securely connected to define a first fluid flowing space and a second fluid flowing space on opposite sides of each heat transmission plate. A first fluid (such as oil) flows through the first fluid flowing space. A second fluid (such as water) flows through the second fluid flowing space. The heat exchange element is formed with a first fluid passage communicating with the first fluid flowing space, and second and third fluid passages which communicate with the second fluid flowing space. The first fluid passage is separate from the second and third fluid passages to prevent mixing of the first and second fluids. Additionally, a cover is fixedly secured to the heat exchange element and formed with a first chamber communicating with the heat exchange element first fluid passage, and second and third chambers communicating respectively with the heat exchange element second and third fluid passages. Each of the first, second and third chambers communicates with an outside of the cover.

Thus, water introduction and discharge chambers (the second and third chambers) can be formed in the cover fixely secured to the heat exchange element, and water inlet and outlet pipes can be installed to the cover. This does not require outwardly protruding projections (forming therein water introduction and discharge passages) on the side surface of the heat exchange element and enables water inlet and outlet pipes to be installed to the cover, thereby making the heat exchanger small-sized while omitting pipes extending upwardly. Accordingly, the heat exchanger can be mounted on an automotive vehicle having a smaller or limited space engine compartment, while preventing tools for attaching and detaching the oil filter from interference with the water inlet and outlet pipes in case the oil filter is used in combination with the heat exchanger. Additionally, since the above-mentioned outwardly protruding projections are not required, the profile of each heat transmission plate is simplified (for example, made circular) and, therefore caulking and brazing of the peripheral, section of each heat transmission plate is facilitated, thereby effectively preventing leaking of oil and water.

BRIEF DESCRIPTION OF THE DRAWINGS

The features and advantages of the heat exchanger according to the present invention will be more clearly appreciated from the following description taken in conjunction with the accompanying drawings in which like reference numerals designate corresponding elements and parts throughout all figures, and in which.

DETAILED DESCRIPTION OF THE INVENTION

Figure 1:
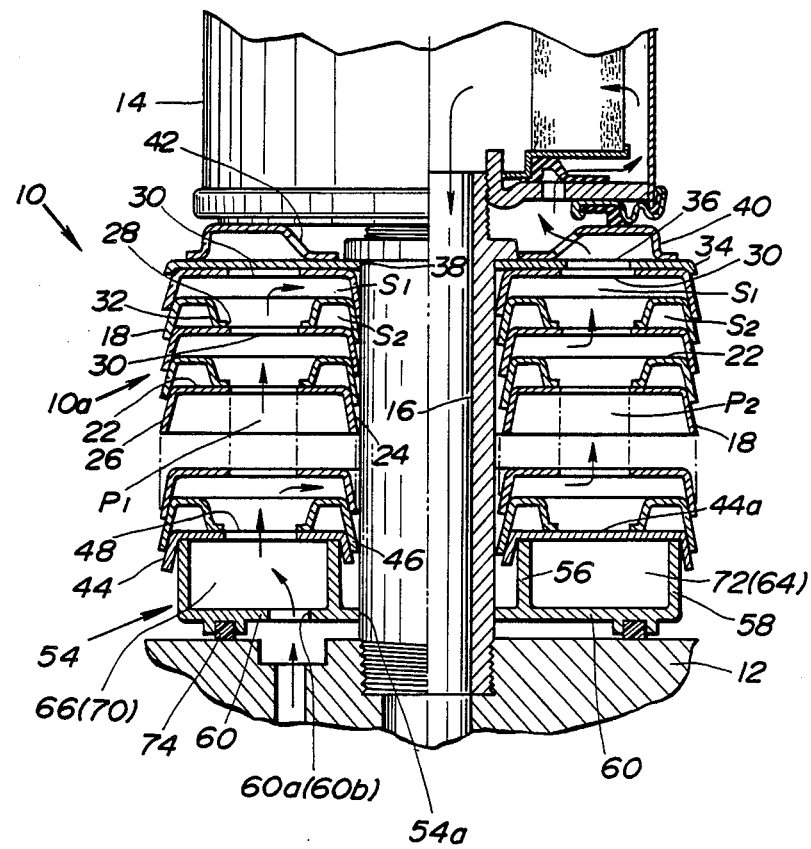
FIG. 1 is a vertical sectional view of a first embodiment of a heat exchanger according to the present invention, taken along a vertical plane passing through vertical fluid (oil) passages of a heat exchange element.

Referring now to FIGS. 1 to 5, there is shown a first embodiment of a plate type heat exchanger or oil cooler 10 in accordance with the present invention. The heat exchanger 10 in this embodiment is used for an internal combustion engine for the purpose of cooling engine lubricating oil with engine coolant such as engine cooling water. The heat exchanger 10 is usually mounted at its bottom section on an engine block 12 so that lubricating oil to be cooled is introduced into the heat exchanger 10. In this instance, the heat exchanger 10 is used in combination with an oil filter 14. The oil filter 14 is mounted on the top section of the heat exchanger 10 so that the cooled lubricating oil is supplied from the heat exchanger 10 to the oil filter 14 so as to filter the lubricating oil. The thus filtered lubricating oil is fed back through a hollow center bolt or tube 16 to the engine block 12.

Figure 3:
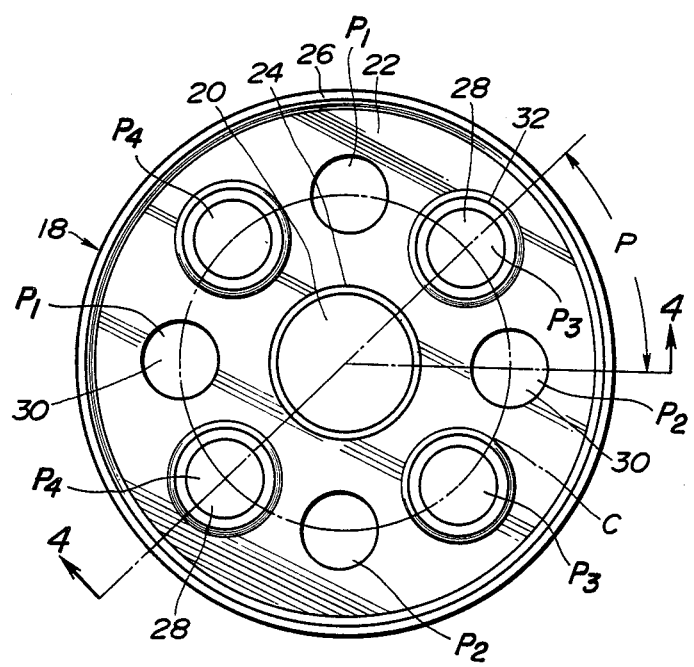
FIG. 3 is a plan view of a heat transmission plate forming part of a heat exchange element of the heat exchanger of FIG. 1.

The heat exchanger 10 comprises a heat exchange element 10a consisting of a plurality of heat transmission plates 18 which are made of a metal and piled up as shown in FIG. 1 in which the adjacent heat transmission plates are fixedly secured to each other, for example, by means of brazing. Each heat transmission plate 18 is generally annular with a central hole 20 as shown in FIG. 3. The heat transmission plate 18 includes an annular flat section 22 having inner and outer periphery. An annular inner flange 24 is integrally connected at its one end with the flat section 22 at the inner periphery. The inner flange 24 is short and generally cylindrical so that the inner diameter thereof decreases in the direction far from the inner periphery of the flat section 22. In other words, the inner flange 24 has the frustoconical inner and outer surfaces. An annular outer flange 26 is integrally connected at its one end with the flange section at the outer periphery. The outer flange 24 is short and generally cylindrical so that the inner diameter thereof increases in the direction far from the outer periphery of the flat section 22. In other words, the outer flange 26 has the frustoconical inner and outer surfaces. The inner and outer flanges 24, 26 are the same in length or height as shown in FIG. 4.

In this embodiment, the heat transmission plate 18 is formed at the flat section 22 with a plurality (four) of circular through-holes 28 and a plurality (four) of circular openings 30 which are aligned circularly in such a manner that the center of each through-hole 28 and each opening 30 resides in an imaginary circle C concentric with the inner and outer peripheries of the heat transmission plate 18 as viewed from the direction of the axis of the heat transmission plate 18 or in the direction of FIG. 3. More specifically, the axis (not identified) each of each through-hole 28 and the opening 30 crosses the imaginary circle C. As shown in FIG. 4, each through hole 28 is defined by an annular flange 32 projected from the flat section 22 in the same direction as the inner and outer flanges 24, 26. The annular flange 32 includes a generally cylindrical portion 32a with inner and outer frustoconical surfaces. An annular flat portion 32b is integral with the cylindrical portion 32a at the free end, defining the through-hole 28. The annular flange 32 is smaller in height or axial length than the inner or outer flange 24, 26. The opening 30 is formed through the flat section 22 of the heat transmission plate 18 with no flange.

As illustrated in FIG. 3, each of the through-holes 28 and each of the openings 30 are located alternately along the imaginary circle C so that each through-hole 28 is located between the two openings 30, 30 while each opening 30 is located between the two through-holes 28, 28. Additionally, the through-holes 28 and the openings 30 are positioned at equal intervals along the circle C in such a manner that a pitch P of a peripheral angle of 45 degrees between the axes of the adjacent through-holes 28 and the opening 30 is equivalent. The pitch P corresponds to a peripheral distance (on the circle C) between the axes of the adjacent through hole 28 and opening 30. In this connection, the axes of the adjacent through-holes 28, 28 are located to form a pitch of an angle of 90 degrees, and the axes of the adjacent openings 30, 30 are located to form a pitch of an angle of 90 degrees.

Figure 2:
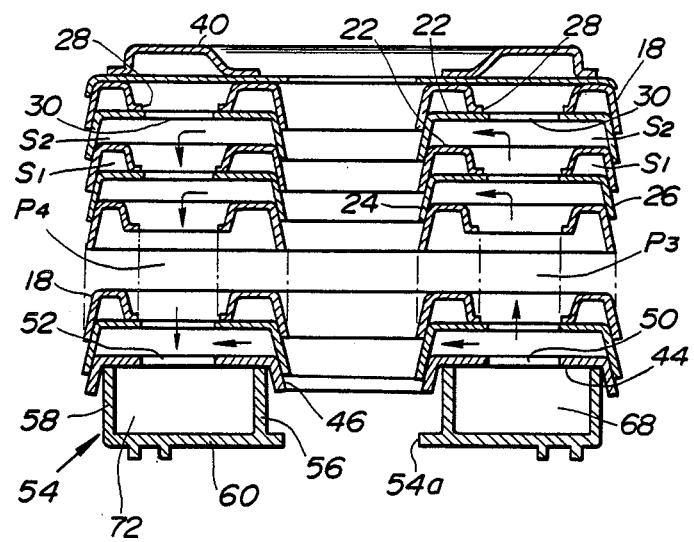
FIG. 2 is a vertical sectional view similar to FIG. 1 and showing the first embodiment heat exchanger taken along another vertical plate passing through vertical fluid (water) passages of the heat exchanger element.
Figure 4:
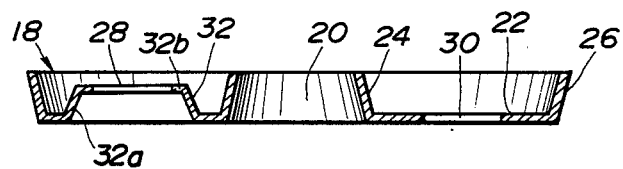
FIG. 4 is a sectional view taken in the direction of arrows substantially along the line 4—4 of FIG. 3.

As illustrated in FIGS. 1 and 2, the heat transmission plates 18 of the above-mentioned type are piled up in such a fashion that each transmission plate 18 shown in FIG. 4 is located upside down. Additionally, the adjacent upper and lower heat transmission plate 18, 18 contacting each other are located shifted relative to each other by the pitch P of the peripheral angle of 45 degrees, so that the axis of each through-hole is aligned with each opening 30 of the upper head transmission plate of the lower heat transmission plate 28, respectively. The adjacent heat transmission plates 18, 18 are securely connected with each other, for example, by means of brazing, maintaining a fluid-tight seal therebetween. As shown, the inner frustoconical surface of the outer flange 26 of the upper heat transmission plate 18 contacts or connects with the outer frustoconical surface of the outer flange 26 of the lower heat transmission plate 18. The outer frustoconical surface of the inner flange 24 of the upper heat transmission plate 18 contacts or connects with the inner frustoconical surface of the inner flange 24 of the lower heat transmission plate 18. Furthermore, the annular flange 32 defining the through-hole 28 of the upper heat transmission plate 18 contacts or connects at its annular flat portion 32b with the flat portion 22 of the lower heat transmission plate 18 in such a manner that the annular flat portion 32b of the upper heat transmission plate 18 is located around the opening 30 of the lower heat transmission plate 18. It will be understood that the thus formed contacted or connected sections of the adjacent upper and lower heat transmission plates 18, 18 are rigidly and sealingly secured to each other, for example, by means of brazing.

Thus, by virtue of the annular flanges 32, first and second fluid flowing spaces $S_1$, $S_2$ are alternately formed completely separate from each other. In this embodiment, engine lubricating oil flows in the first fluid flowing spaces $S_1$ while engine cooling water flows in the second fluid flowing spaces $S_2$. In addition, a vertically aligned row of the through-holes 28 and the openings 30 forms a vertical fluid passage, thereby forming eight vertical fluid passages as a whole. Of these vertical fluid passages, the first and second vertical fluid passages form a first group of vertical fluid passages $P_1$, the third and fourth vertical fluid passages a second group of vertical fluid passages $P_2$, the fifth and sixth vertical fluid passages third group of vertical fluid passage $P_3$, and the seventh and eighth vertical fluid passages a fourth group of vertical fluid passages $P_4$. Accordingly, the first group of the vertical fluid passages $P_1$ include the two openings 30 of the upper-most heat transmission plate 18 and the two through-holes 28 of the lower-most heat transmission plate 18 as shown in FIG. 1. Similarly, the second group of vertical fluid passages $P_2$ include the other two openings 30 of the upper-most heat transmission plate 18 and the other two through-holes 28 of the lower-most heat transmission plate 18. The third groups of the vertical fluid passages $P_3$ includes the two through-holes 28 of the upper-most heat transmission plate 18 and the two openings 30 of the lower-most heat transmission plate 18 as shown in FIG. 2. Similarly, the fourth group of the vertical fluid passages $P_4$ include the other two through-holes 28 of the upper-most heat transmission plate 18 and the other two openings 30 of the lower-most heat transmission plate 18. It will be appreciated that the engine lubricating oil flows through the first and second groups of vertical fluid passages $P_1$, $P_2$, while the engine cooling water flows through the third and fourth groups of vertical fluid passages $P_3$, $P_4$.

An annular upper closure plate 34 is secured onto the upper-most heat transmission flat section 22, for example, by means of brazing and formed with openings 36, 36 communicated with the second groups of vertical fluid passages $P_2$. More specifically, the openings 36, 36 are coincident with the two openings 30, 30 (of the upper-most heat transmission plate 18) forming part of the second groups of vertical fluid passages $P_2$. The other two openings 30 and all the four through-holes 28 (of the upper-most heat transmission plate 18) forming part of the first, third and fourth groups of vertical fluid passages $P_1$, $P_3$ and $P_4$ are closed with the upper closure plate 34, for example, by means of brazing and defines thereinside an oil outlet chamber (no numeral) communicated with the second groups of vertical fluid passages $P_2$. The annular top cover 40 is formed with an oil outlet opening 42.

An annular lower closure plate 44 is secured to the lower-most heat transmission plate 18, for example, by means of brazing. The lower closure plate 44 is formed with a central hole 46 and includes an annular flat section 44a to which the annular flanges 32 are secured. The annular flat section 44a is formed with openings 48, 38 coincident with the respective through-holes 28, 28 (of the lower-most heat transmission plate 18) forming part of the first group of the vertical fluid passages $P_1$. The annular section 44a is further formed with water inlet and outlet openings 50, 52 as shown in FIG. 2. The water inlet opening 50 is communicated with the openings 30 (of the lower-most heat transmission plate 18) forming part of the third group of vertical fluid passage $P_3$. The water outlet opening 52 is communicated with the openings 30 (of the lower-most heat transmission plate 18) forming part of the fourth group of vertical fluid passage $P_4$.

Figure 5:
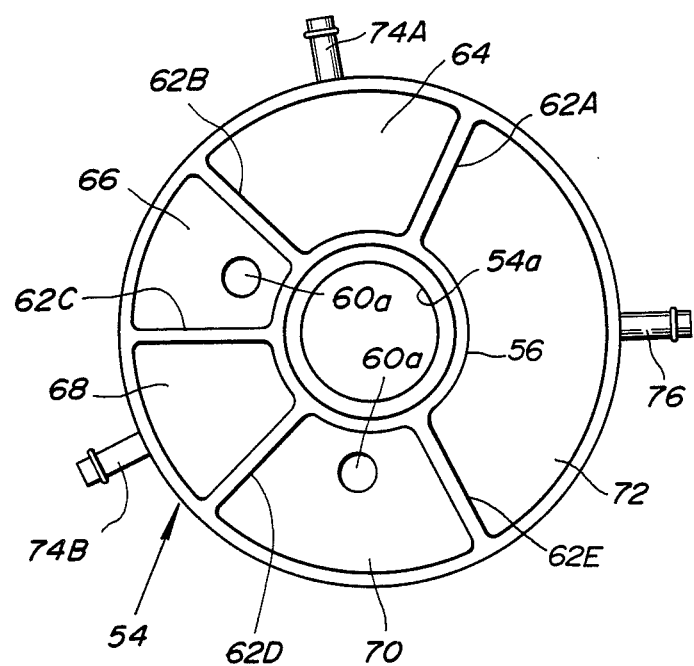
FIG. 5 is a plan view of an under cover of the heat exchanger of FIG. 1.
Figure 6:
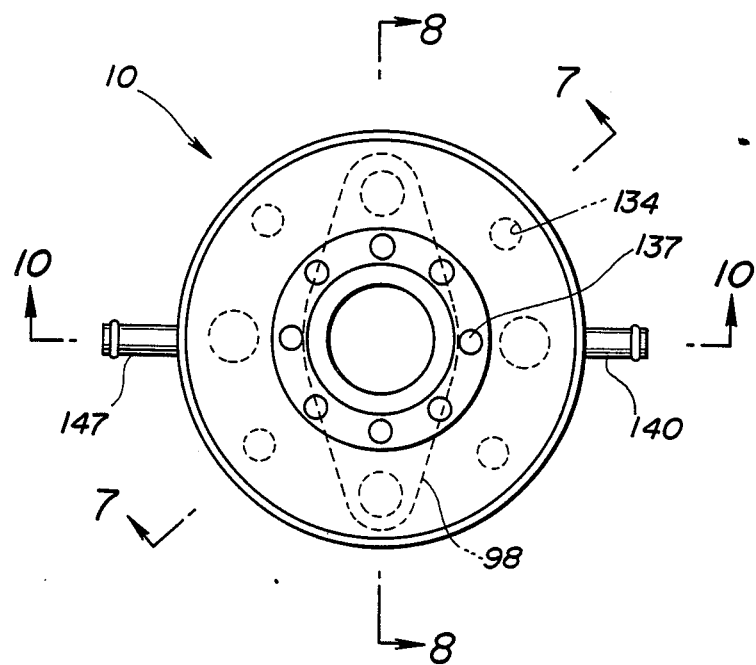
FIG. 6 is a plan view of a second embodiment of the heat exchanger according to the present invention.

A generally annular cup-shaped under cover 54 formed of one-piece aluminium die casting is fixedly secured to the lower closure plate 44, for example, by means of brazing. The under cover 54 is formed with a central opening 54a in which the center tube 16 is disposed as shown in FIG. 1. More specifically, the under cover 54 includes inner and outer cylindrical wall sections 56, 58 which are coaxial with each other around the center axis of the center tube 16 and spaced from each other. The inner and outer cylindrical wall sections 56, 58 extend parallel with each other along the center axis of the center tube 16. The inner cylindrical wall section 56 defines thereinside a central opening 54a. A bottom plate section 60 of the under cover 54 is integral with the lower end of the inner and outer cylindrical wall sections 56, 58, thereby defining an annular cup-shaped space (no numeral). Additionally, as shown in FIG. 5, first, second, third, fourth, and fifth partition walls 62A, 62B, 62C, 62D, 62E are arranged within the cup-shaped space of the under cover 54 and integral with the inner and outer cylindrical wall sections 56, 58 and with the bottom plate section 60. Each partition wall 62A, 62B, 62C, 62D, 62E extends vertically in parallel with an imaginary vertical plane containing the center axis of the center bolt 16 or the extension of the center axis of the heat exchanger element 10a, and further extends radially so as to connect the inner and outer cylindrical wall sections 56, 58. Each partition wall 62A, 62B, 62C, 62D, 62E is flush at its upper end with that of the inner and outer cylindrical wall sections 56, 58 and fixedly secured together with the inner and outer cylindrical wall sections 56, 58 with the lower closure plate 44, for example, by means of brazing.

A first water introduction chamber 64 is defined between the first and second partition walls 62A, 62B and communicates with one of the water inlet openings 50 of the lower closure plate 44. A first oil supply chamber 66 is defined between the second partition wall 62B and the third partition wall 62C, and communicates with one of the oil inlet openings 48 of the lower closure plate 44. A second water introduction chamber 68 is defined between the third and fourth partition walls 62C, 62D and communicates with the other water inlet opening 50. A second oil supply chamber 70 is defined between the fourth and fifth partition walls 62D, 62E and communicates with the other oil inlet opening 48. A water discharge chamber 72 is defined between the first and fifth partition walls 62A, 62E and communicates with the water outlet openings 52, 52 of the lower closure plate 44. As clearly shown in FIG. 5, each of chambers 64 to 72 is generally fan-shaped or in the sector form in cross-section. The under cover bottom plate section 60 is formed with two openings 60a, 60b which are respectively opened to the two oil supply chambers 66, 70 so that oil from the engine block 12 is introduced through the openings 60a, 60b into the oil supply chambers 66, 70.

The under cover 54 is provided with two water introduction pipes 74A, 74B which are respectively opened to the first and second water introduction chambers 66, 70 and a water discharge pipe 76 opened to the water discharge chamber 72, so that water to be supplied to the heat exchanger element 10a is introduced through the water introduction pipes 74A, 74B into the water introduction chambers 66, 70 while water from the heat exchange element 10a is discharged out of the under cover 54 through the water discharge pipe 76. The heat exchanger 10 is securely mounted on the engine block 12 through a gasket 74 disposed between the under cover bottom plate section 60 and the engine block 12 as shown in FIG. 1. It will be understood that by virtue of a plurality of vertically and radially arranged partition walls 62A to 62E, the under cover 54 is sufficiently reinforced so as to be endurable to compressive force applied thereto when the heat exchanger 10 is installed to the engine block upon the center tube 16 being screwed into the engine block 12 or when the oil filter 14 is mounted on the heat exchanger 10 upon being screwed in around the center tube 16.

The manner of operation of the thus arranged heat exchanger 10 will be discussed hereinafter.

The engine lubricating oil from an oil pan of the engine block 12 is introduced through the bottom plate section openings 60a, 60b into the first and second oil supply chambers 66, 70 of the under cover 54 and then supplied into the first group of vertical fluid passages $P_1$ of the heat exchanger 10. The lubricating oil flows upwardly through the first group of vertical fluid passages $P_1$ and simultaneously flows through the horizontally extending fluid spaces $S_1$ and reaches the second group of vertical fluid passages $P_2$. Thereafter, the lubricating oil flows out of the heat exchanger 10 through the openings 30, 36 and the oil outlet opening 42. The lubricating oil discharged from the heat exchanger 10 is then introduced into the oil filter 14 to be filtered. The thus filtered lubricating oil discharged from the filter 10 is fed back to the engine block 12 through the inside hollow of the center bolt 16. During such lubricating oil flow in the above-mentioned manner, the engine cooling water enters the first and second water introduction chambers 64, 68 through the water introduction pipes 74A, 74B and is thereafter introduced through the water inlet opening 50 into the third group of vertical fluid passages $P_3$. The cooling water flows upward through the vertical fluid passages $P_3$ and simultaneously the cooling water flows through the horizontally extending fluid flowing spaces $S_2$ located between the above-mentioned fluid flowing spaces $S_1$ of the lubricating oil. The thus flowing cooling water reaches the fourth group of vertical fluid passages $P_4$ and flows downward to be introduced into the water outlet chamber 62 through the water outlet opening 52. Thereafter, the cooling water is fed out of the heat exchanger 10. It is to be noted that heat exchange between the lubricating oil and the cooling water is carried out through the wall of the annular flanges 32 defining the through-holes 28 in addition to through the wall of the flat sections 22 of the heat transmission plates 18.

Accordingly, the heat exchange element 10a of the heat exchanger 10 of this embodiment is constructed of the heat transmission plates of the equivalent shape, and therefore production of the heat exchanger is facilitated to improve the productivity of the same while lowering the production cost of the heat exchanger. Furthermore, the equivalent shape heat transmission plates are excellent in fitness to each other thereby to maintain tight seal therebetween, thus preventing the leaking of the lubricating oil and/or the cooling water. Since heat exchange between the lubricating oil and the cooling water is accomplished also through the wall of the annular flanges 32 of each heat transmission plate in addition to through the flat section 22 of the same, the area of heat exchange becomes larger. Additionally, the annular flanges 32 serve as support columns between the adjacent upper and lower heat transmission plates, and consequently no reinforcement members are necessary between the adjacent heat transmission plates. Moreover, by suitably selecting the location or the number of the through-holes 28 and the openings 30, it is possible, for example, to produce turbulent flow of the lubricating oil and the cooling water and to allow the lubricating oil and the cooling water to flow in the directions of counterflow, thereby improving heat exchange efficiency of the heat exchanger.

Figure 7:
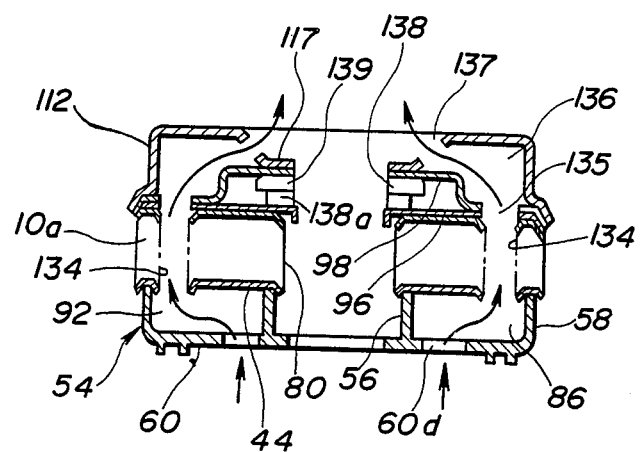
FIG. 7 is a vertical sectional view taken in the direction of arrows substantially along the line 7—7 of FIG. 6.
Figure 8:
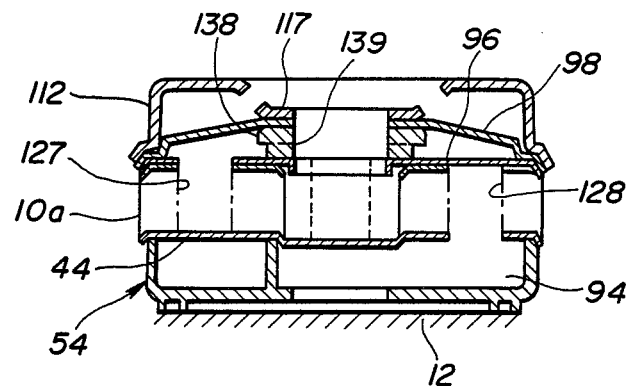
FIG. 8 is a vertical sectional view taken in the direction of arrows substantially along the line 8—8 of FIG. 6.
Figure 9:
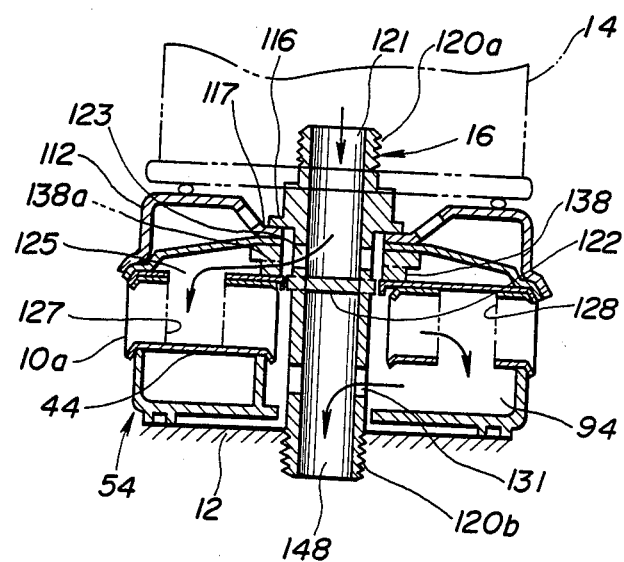
FIG. 9 is a vertical sectional view similar to FIG. 7 but showing a state in which the heat exchanger is installed on a connector pipe together with an oil filter.

FIGS. 6 to 15 illustrate a second embodiment of the heat exchanger 10 according to the present invention, which is similar to the first embodiment with the exception that oil is cooled by the heat changer element 10a after being purified by the oil filter 14. In this embodiment, the heat exchanger 10 comprises the heat exchanger element or core 10a which is formed of a plurality of the heat transmission plates 18 piled up and fixedly secured, for example, by brazing. An upper plate 112 is fixedly secured to the top section of the heat exchange element 10a. Additionally, the under cover 54 is fixedly secured to the bottom section of the heat exchange element 10a. The heat exchanger element 10a is formed with a central through-hole 80 in which the center tube or connector pipe 16 is disposed as shown in FIG. 9. The oil filter 14 is mounted on the upper plate 112, upon being secured to the connector pipe 16. The upper plate 112 is formed depressed at its central section 117 having an opening (no numeral) through which the connector pipe 16 passes. The upper plate central section 117 is in secure contact with the annular flange section 116 of the connector pipe 16 to maintain a liquid tight seal.

Figure 10:
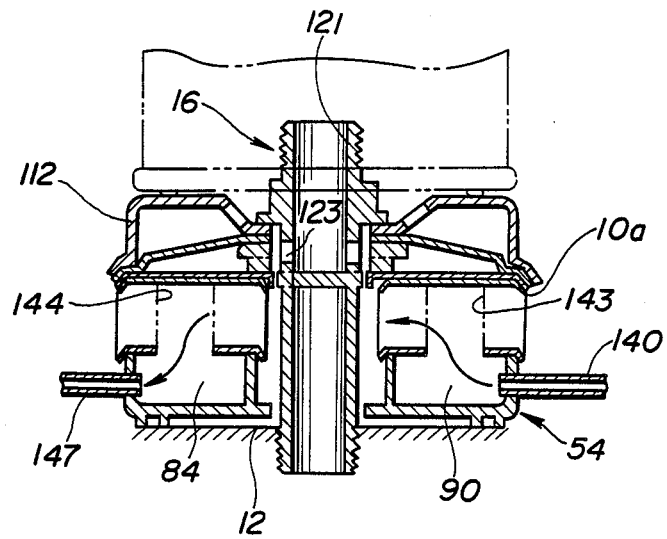
FIG. 10 is a vertical sectional view similar to FIG. 9 but showing the heat exchanger taken in the direction of arrows substantially along the line 10—10 of FIG. 6.
Figure 11:
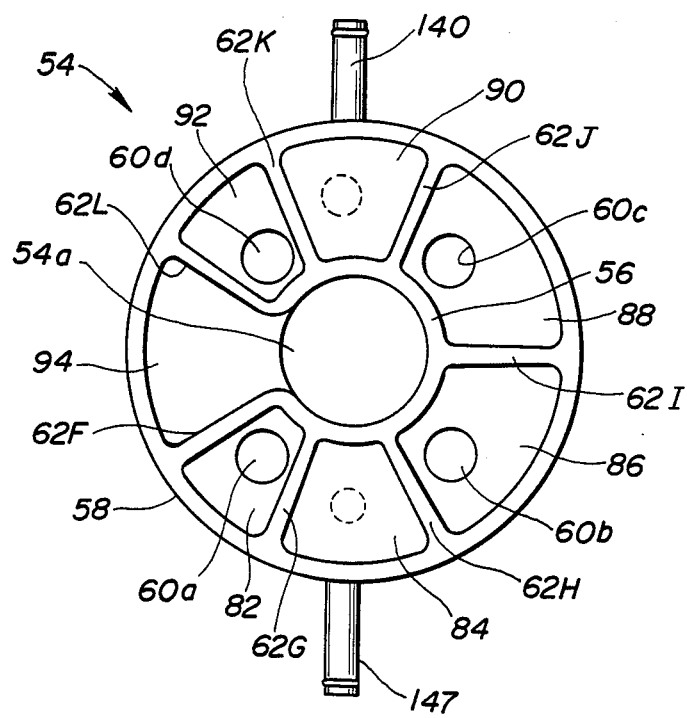
FIG. 11 is a plan view of an under cover according to a second embodiment of the present invention.

As shown in FIG. 11, the under cover 54 in this embodiment is provided with seven partition walls 62F, 62G, 62H, 62I, 62J, 62K, 62L which are similar to those 62A to 62E of the first embodiment as shown in FIG. 5. A first oil supply chamber 82 is defined between the first and second partition walls 62F, 62G. A second oil supply chamber 86 is defined between the third and fourth partition walls 62H, 62I. A third oil supply chamber 88 is defined between the fourth and fifth partition walls 62I, 62J. A fourth oil supply chamber 92 is defined between the sixth and seventh partion walls 62K, 62L. The first, second, third, and fourth oil supply chambers 82, 86, 88, 92 communicate with the oil supply passages 134 of the heat exchange element 10a, respectively, through openings formed in the closure or end plate 44 as shown in FIG. 7. The oil supply chambers 82, 86, 88, 92 communicate through the oil inlet openings 60a, 60b, 60c, 60d with an oil gallery formed in the engine block or bracket (not shown), respectively. Each of the oil inlet openings 60a to 60d is formed through the bottom plate section 60 of the under cover 54. An oil discharge chamber 94 is defined between the first and seventh partition walls 62F, 62L and communicates with an oil outflow passage 128 formed in the heat exchange element 10a. The oil discharge chamber 94 further communicates with a lower central hole 148 formed in the connector pipe 16 through openings 131 of the connector pipe as shown in FIG. 9. The through-hole 148 of the connector pipe 16 communicates with the oil gallery formed in the engine block. A water introduction chamber 90 is defined between the fifth and sixth partition walls 62J, 62K and communicates with a water inflow passage 143 formed in the heat exchanger element 10a through an opening formed in the closure plate 44 as shown in FIG. 10. The water introduction chamber 143 is supplied with water through a water introduction pipe 140. A water discharge chamber 84 is defined between the second and third partition walls 62G, 62H and communicates with a water outflow passage 144 formed in the heat exchanger element 10a through an opening formed in the closure plate 44 as shown in FIG. 10, in which water in the chamber 84 is discharged out through a water discharge pipe 147.

Each oil supply passage 143 communicates with the upstream side of a filter medium (not shown) of the oil filter 14 through an opening 135 of a base or upper end plate (96) located on the heat exchange element 10a and openings 137 formed through the upper plate 112. An oil passage 136 is formed inside the upper plate 112 to fluidly connect the openings 135, 137. A separation plate 98 is fixedly secured to the base plate 96 to define a chamber (no numeral) which communicates with the oil inflow passage 127 of the heat exchanger element 10a as best seen from FIG. 8 which chamber is separated from the oil passage 136. The separation plate 98 is fixedly secured to the upper plate 112. An annular reinforcement member 138 is fixedly secured between the base plate 96 and the separation plate 98 and coaxially arranged with the heat exchanger element 10a, so that the connector tube 16 passes through a central opening 139 of the reinforcement member 138. The reinforcement member 138 is formed with a plurality of radial openings 138a. The connector pipe 16 is formed with an upper central hole 121 communicated with the downstream side of the filter medium of the oil filter 14. The upper central hole 121 is separate from the lower central hole 148 by a partition wall 122 of the connector pipe 16. The upper central hole 121 of the connector pipe 16 communicates with the oil inflow passage 10a of the heat exchanger element 127 through radial openings 123 of the connector pipe 16 and the radial openings 138a of the reinforcement member 138. Thus, oil from the oil filter 14 flows down through an oil return path (no numeral) including the oil inflow and outflow passages 127, 118. The connector pipe 16 is formed with an upper threaded section 120a to be screwed in the oil filter 14, and a lower threaded section 12b to be screwed in the engine block or engine bracket.

Figure 12:
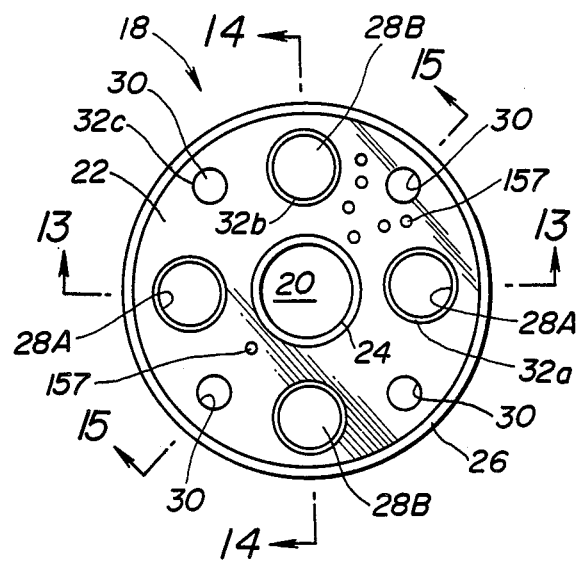
FIG. 12 is a plan view of a third embodiment of a heat exchanger according to the present invention.
Figure 13:
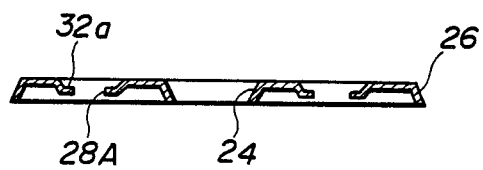
FIG. 13 is a cross-sectional view taken in the direction of arrows substantially along the line 13—13 of FIG. 12.
Figure 14:
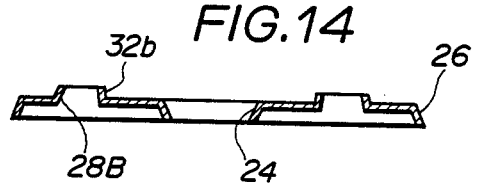
FIG. 14 is a cross-sectional view taken in the direction of arrows substantially along the line 14—14 of FIG. 12.
Figure 15:
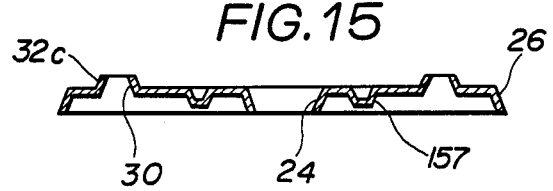
FIG. 15 is a cross-sectional view taken in the direction of arrows substantially along the line 15—15 of FIG. 12.

In this embodiment, the heat exchanger element 10a is constructed of a plurality of the heat transmission plates or core plates 18 as shown in FIG. 12. In the heat transmission plate 18, two first through-holes 28A are formed opposite to each other with respect to the axis thereof. Additionally, two second through-holes 28B are formed opposite to each other with respect to the axis thereof. The first and second through-holes 28A, 28B are concentrically located. Four openings 30 are formed in the heat transmission plate 18 in such a manner that each opening 30 is located between the first and second through-holes 28A, 28B. The openings 30 are concentrically located. It is to be noted that the through-holes 28A, 28B are so positioned that their axes are at equal intervals along a circle (not shown) connecting the axes, whereas the openings 30 are so positioned that their axes are at equal intervals along a circle (now shown) connecting the axes. Each first through-hole 28A is defined by an annular flange or bent portion 32a projected downwardly as shown in FIG. 13. Each second through-hole 28B is defined by an annular flange or bent portion 32b projected upwardly as shown in FIG. 14. Each opening 30 is defined by an annular flange or bent portion 32c projected upwardly as shown in FIG. 15. Additionally, the heat transmission plate 18 is formed at its surface with a plurality of embossments 157 located at predetermined positions as shown in FIG. 12. In this embodiment, a plurality of embosses 157 and a single emboss 157 are located opposite to each other with respect to the axis of the heat transmission plate member 18.

Figure 20:
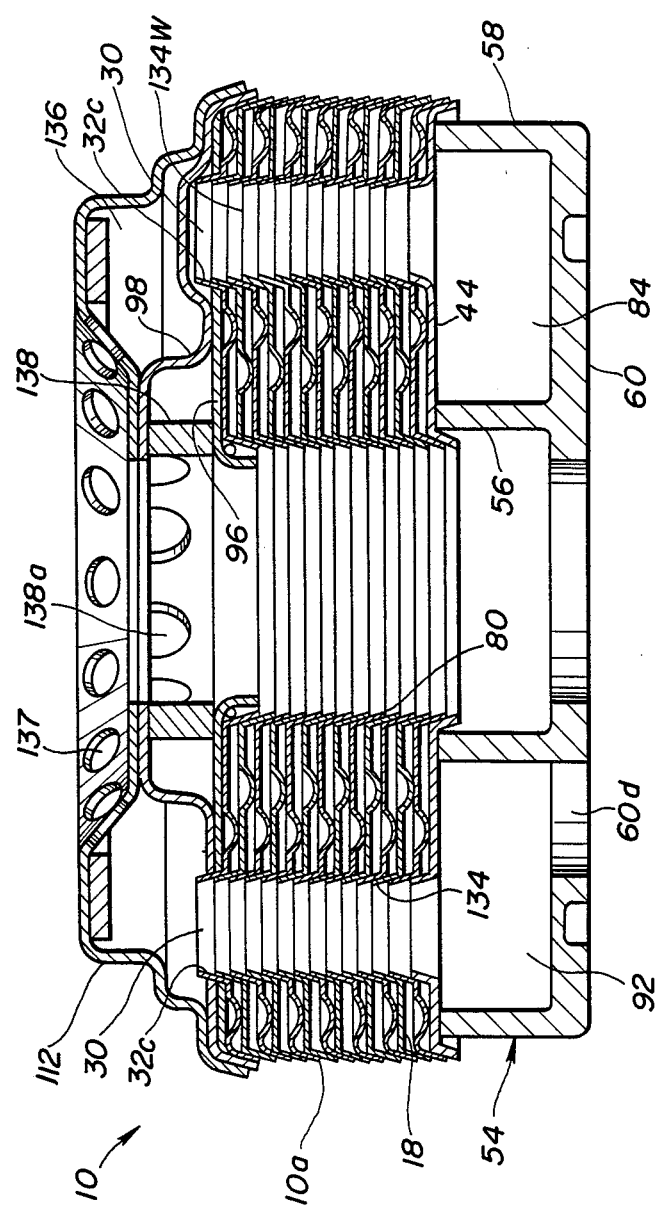
FIG. 20 is an enlarged vertical sectional view taken in the direction of arrows substantially along the line 20—20 of FIG. 19.
Figure 21:
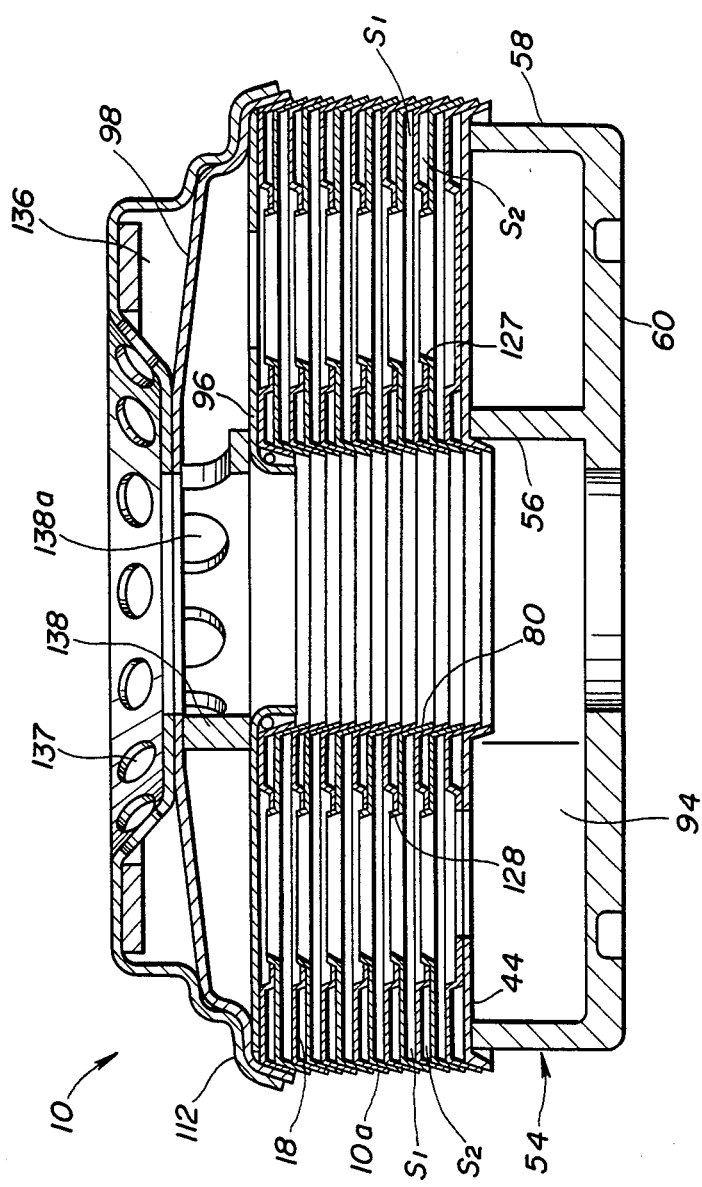
FIG. 21 is an enlarged vertical sectional view taken in the direction of arrows substantially along the line 21—21 of FIG. 19.
Figure 22:
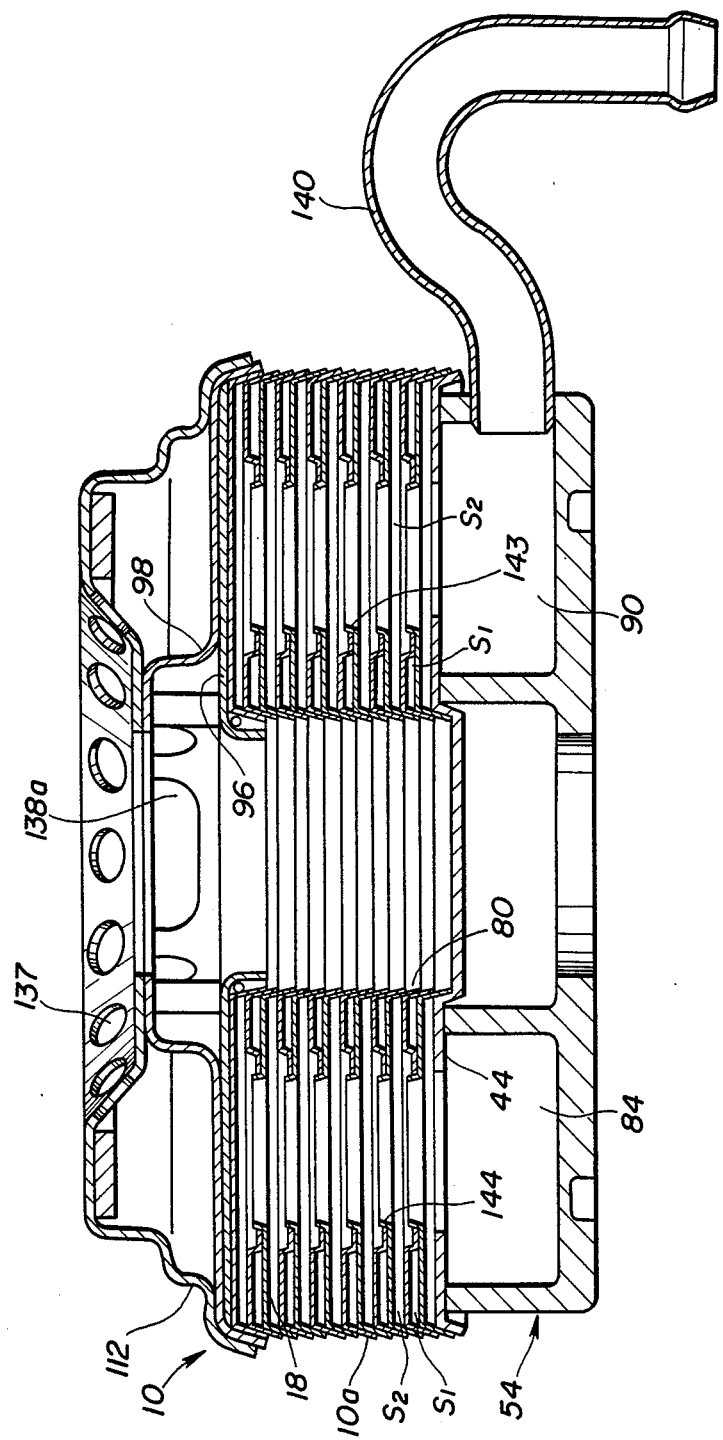
FIG. 22 is an enlarged vertical sectional view taken in the direction of arrows substantially along the line 22—22 of FIG. 19.

In order to assemble the heat exchange element 10a, a plurality of the heat transmission plates 18 are coaxially piled up in parallel in such a manner that upper one 18 of the adjacent heat transmission plates 18, 18 is angularly shifted an angle of 90° with respect to the lower one 18 around the aligned axes of the piled heat transmission plates 18, is in the first embodiment as illustrated in FIG. 1 and 2. The adjacent heat transmission plates 18, 18 are fixedly secured at their contacting portions with each other, for example, by means of brazing. Accordingly, the resultant heat exchange element 10a is constituted as follows: The upwardly projecting annular flanges 32c (as shown in FIG. 15) of the adjacent heat transmission plates 18 are engaged and fixedly secured to form the four pipe-like oil supply passages 134 as seen from FIG. 7. This will be clearly seen also from FIG. 20 of a fourth embodiment of the heat exchanger according to the present invention which will be discussed with reference to FIGS. 17 to 22. The two downwardly projecting annular flanges 32a, 32a of the upper one of the three heat transmission plates 18 are respectively engaged and fixedly secured with the two upwardly projecting annular flanges 32b, 32b of the middle one of the three heat transmission plate thereby to form the oil inflow passage 127 and the oil outflow passage 128 as shown in FIG. 8. This will be clearly seen also from FIG. 21 of the fourth embodiment. It will be understood that the oil inflow and outflow passages 127, 128 communicate with the oil flowing spaces $S_1$ each defined between the adjacent heat transmission plates 18, 18. Similarly, the two downwardly projecting annular flanges 32a, 32a of the middle one of the three heat transmission plates 18 are respectively engaged and fixedly secured with the two upwardly projecting annular flanges 32b, 32b of the lower one of the three heat transmission plates 18 thereby to form the water inflow passage 43 and the water outflow passage 44 as shown in FIG. 10. This will be clearly seen also from FIG. 22 of the fourth embodiment. It will be understood that the water inflow and outflow passages 143, 144 communicate with the water flowing spaces $S_2$ each defined between the adjacent heat transmission plates 18, 18.

Additionally, the embosses 157 formed on the surface of each heat transmission plate 18 in the thus assembled heat exchange element 10a are located in such a manner that the embosses 157 of the adjacent heat transmission plates 18, 18 are angularly shifted 90°, thereby forming the oil and water flowing spaces $S_1$, $S_2$ each having a vertical distance corresponding to the height of the projected emboss 157. It will be understood that such oil and water flowing spaces $S_1$, $S_2$ may be formed under engagement of the annular flanges 24, 26, 32a, 32b, 32c of the adjacent heat transmission plates 18, 18 without using the embosses 157.

With the thus arranged heat exchanger 10 of the second embodiment of FIGS. 6 to 15, oil introduced into the oil introduction chambers 82, 86, 88, 92 flows upwardly through the oil supply passages 134 formed in the heat exchange element 10a, and thereafter supplied through the oil passage 136 into the oil filter 14 to be filtered. The filtered oil from the oil filter 14 enters the upper central hole 121 of the connector pipe 16, and introduced into the chamber inside the separation plate 98 through the radial openings 123, 138a of the connector pipe 16 and the reinforcement member 138. This oil enters the oil inflow passage 127 of the heat exchange element 10a, and then flows through the oil flowing spaces $S_1$ formed between the adjacent heat transmission plates 18, 18. The oil flowing through the oil flowing space $S_1$ reaches the oil outflow passage 128 of the heat exchange element 10a and flows down to be supplied to the oil discharge chamber 94 of the under cover 54 to be discharged from the heat exchanger 10. During such flow of the oil, water introduced into the water introduction chamber 90 of the under cover 54 flows upwardly through the water inflow passage 143 of the heat exchange element 10a and flows through the water flowing space $S_2$ between the adjacent heat transmission plates 18, 18. The thus flowing oil reaches the water outflow passage 144 of the heat exchange element 10a, and is then supplied to the water discharge chamber 84 of the under cover 54 to be discharged out of the heat exchanger 10.

While each heat transmission plate 18 has been shown and described as to be so configurated that each flange 32a defining the through-hole 28A projects downwardly, each flange 32b defining the through-hole 28B projects upwardly, and the flange 32c defining the opening 30 projects upwardly, it will be understood that the flanges 32a, 32b, 32c may project in the opposite directions, respectively, to the above-mentioned directions. It will be further understood that the number of the through-holes 28A, the through-holes 28B, the openings 30 of each heat transmission plate 18 is not limited to that shown and described above, so that the number of them may be two times of that in the second embodiment, in which the heat transmission plates are so piled up for assembling that the adjacent heat transmission plates 18, 18 are angularly shifted an angle of 45° thereby to obtain two times number of the oil supply passage 134, the oil inflow passage 128, the oil outflow passage 127, the water inflow pasage 143, and the water outflow passage 144 formed in the heat exchange element 10a.

Although the heat exchange element 10a of the first and second embodiments has been shown and described as being constructed of a plurality of the heat transmission plates which are equivalent in shape, it will be understood that it may be constructed of a plurality of heat transmission plates which are different in shape, in which the heat transmission plates may include two kinds of heat transmission plates in shape.

Figure 16:
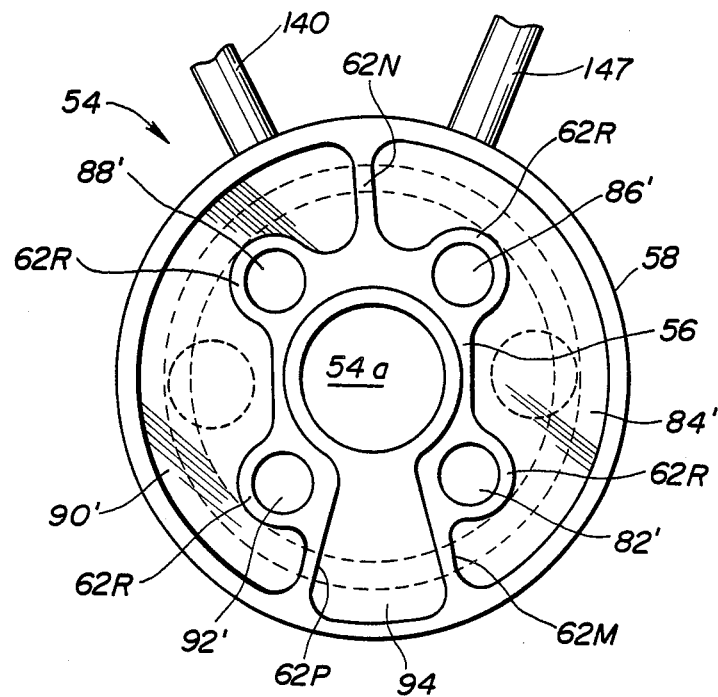
FIG. 16 is a plan view of the under cover of a third embodiment of the heat exchanger according to the present invention.
Figure 17:
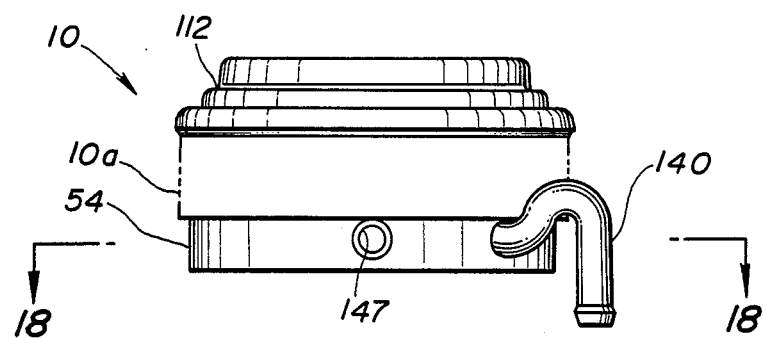
FIG. 17 is an elevation of a fourth embodiment of the heat exchanger according to the present invention.

FIG. 16 shows another example of the under cover 54 of a third embodiment of the heat exchanger 10 according to the present invention, which is similar to that of the second embodiment as shown in FIG. 11 with the exception that the four oil supply chambers 82', 86', 88', 92' are not formed by the radially extending partition walls. In this embodiment, the four oil supply chambers 82', 86', 88', 92' are formed circular in the inner cylindrical wall section 56' of the under cover 54 and communicate with the oil supply passages 134 of the heat exchange element 10a, respectively, as shown in FIG. 7. In other words, each oil supply chamber 82', 86', 88', 92' is fined by a vertically extending semicylindrical partition wall 62R integral with the inner cylindrical wall section 56' of the under cover 54. The oil discharge chamber 94 is defined between radially extending partition walls 62M, 62P and communicates with the oil outflow passage 128 of the heat exchange element 10a as shown in FIG. 8. The water introduction chamber 90' is defined between the partition wall 62P and a radially extending partition wall 62N and formed generally arcuate so as to embrace the oil supply chambers 88', 92'. The water discharge chamber 84' is defined between the partition walls 62M, 62N and formed generally arcuate so as to embrace the oil supply chambers 82', 86'. The water introduction and discharge chambers 90', 84' communicate with the water inflow and outflow passages 143, 144, respectively, as shown in FIG. 10.

Figure 18:
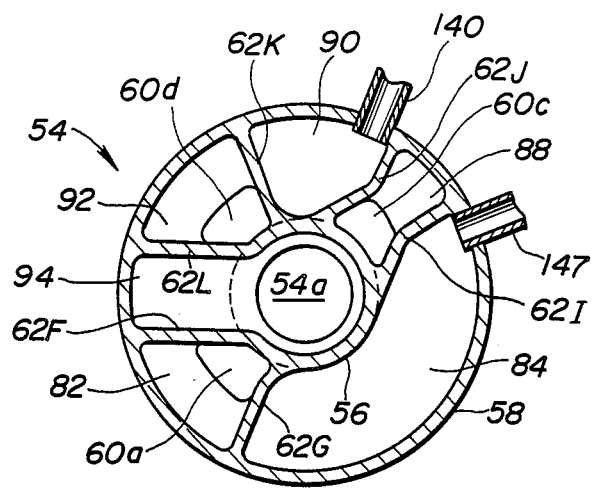
FIG. 18 is a transverse sectional view taken in the direction of arrows substantially along the line 18—18 of FIG. 17.
Figure 19:
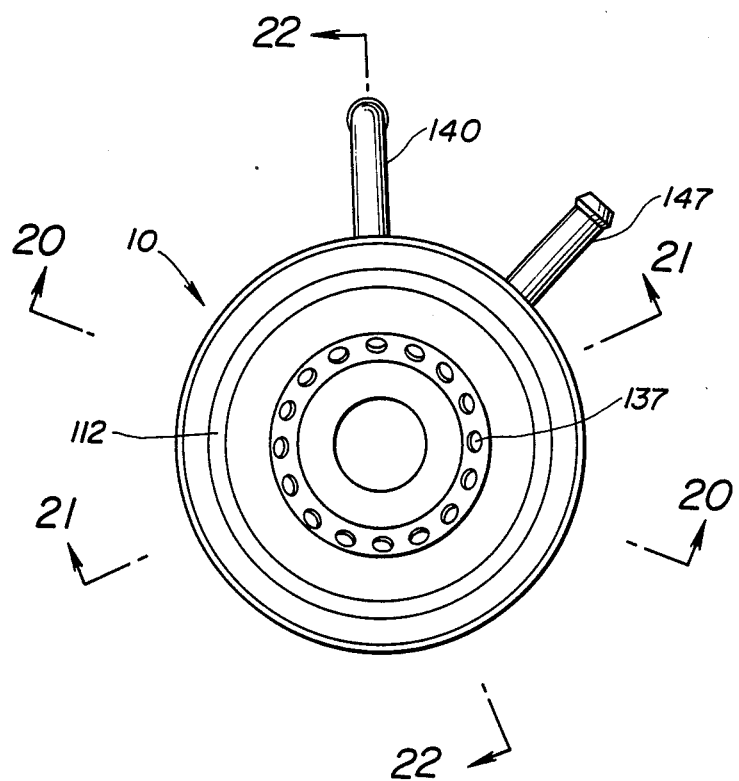
FIG. 19 is a plan view of the heat exchanger of FIG. 17.

FIGS. 17 to 22 illustrate a fourth embodiment of the heat exchanger 10 according to the present invention, similar to the second embodiment of FIGS. 6 to 15 except for the number of the oil supply passages 134 in the heat exchange element 10a and of the oil supply chambers of the under cover 54. In this embodiment, as shown in FIG. 18, only the three oil supply chambers 82, 88, 92 are formed so as to respectively communicate with the three oil supply passages 134 formed in the heat exchange element 10a. The water introduction chamber 90 of this embodiment is enlarged in volume or cross-sectional area and defined between the partition walls 62J, 62K. The water discharge chamber 84 is defined between the partition walls 62G, 62I. Accordingly, one of the four oil supply passages 134 of this embodiment communicates with the water introduction chamber 90 of the under cover 54 as seen from FIG. 20, so that the one of the oil supply passages 134 serves as a water chamber 134W. The upper end of the water chamber 134W is tightly closed with the separator plate 98 so that water is stored therein.

Figure 23:
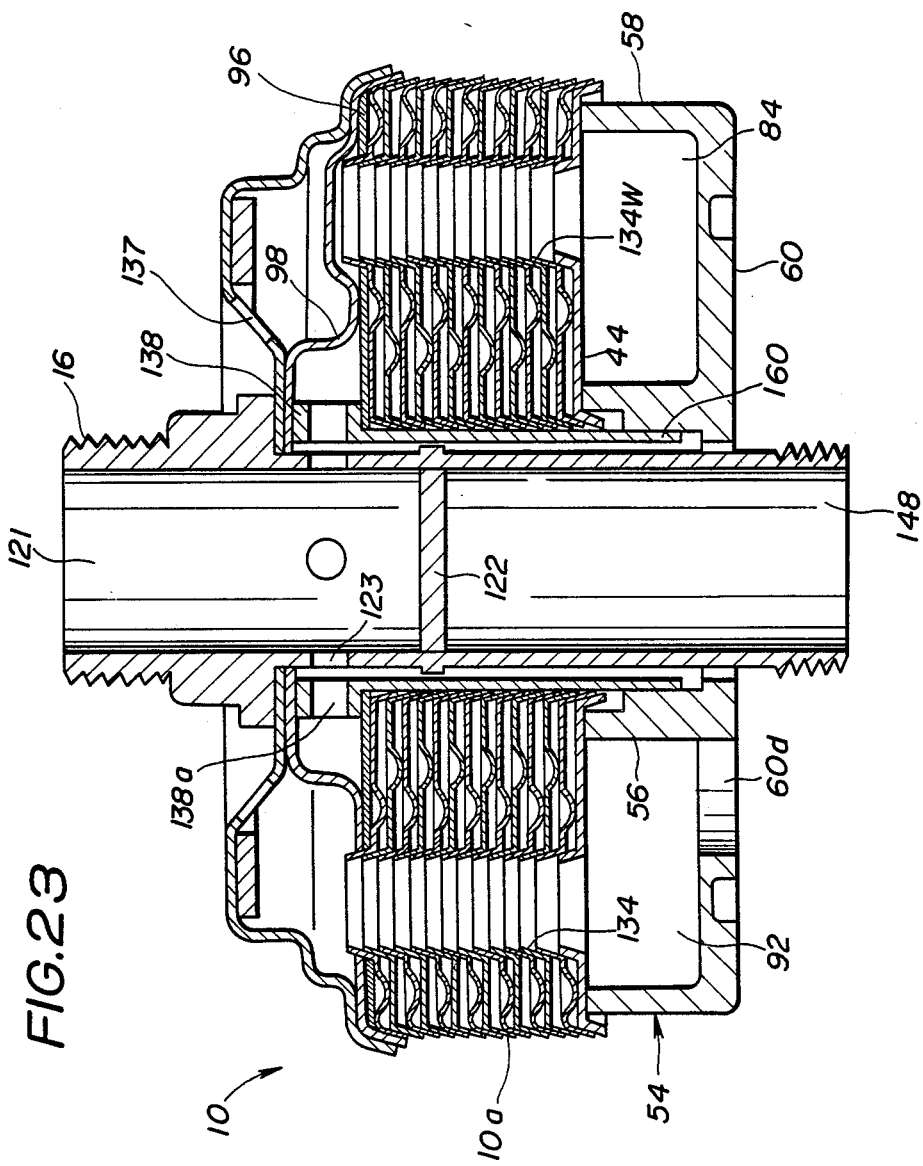
FIG. 23 is an enlarged vertical sectional view similar to FIG. 20 but showing a fifth embodiment of the heat exchanger in accordance with the present invention.

FIG. 23 illustrates a fifth embodiment of the heat exchanger 10 according to the present invention, similar to the fourth embodiment of FIGS. 17 to 22 with the exception that the reinforcement member 138 disposed between the base plate 96 and the separator plate 98 is integrally formed with a downwardly extending cylindrical section 138a. The cylindrical section 138a is located in the central through-hole of the heat exchange element 10a and disposed between the inner peripheral section of the heat exchange element 10a and the outer periphery of the connector pipe 16. The lower end portion of the cylindrical section 138a is brought into contact with the inner surface of the inner cylindrical wall section 56 of the under cover 54.

Figure 24:
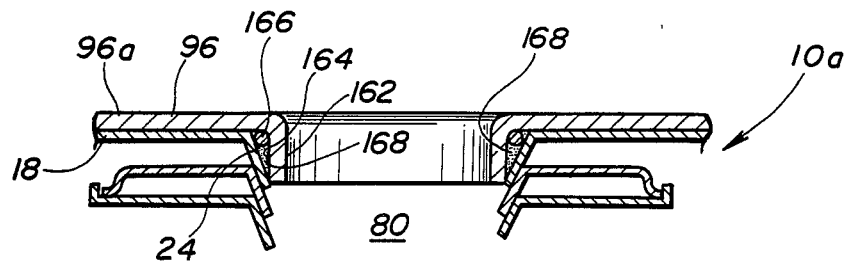
FIG. 24 is an enlarged fragmentary sectional view of an essential part of a sixth embodiment of the heat exchanger in accordance with the present invention.

FIG. 24 shows an essential part of a sixth embodiment of the heat exchanger 10 in accordance with the present invention which embodiment is similar to the fourth embodiment. In this embodiment, the heat exchange element 10a is provided with the upper end plate or base plate 96 fixedly secured to the upper-most heat transmission plate 18 of the heat exchange element 10a like in the various embodiments. The upper end plate 96 is annular and bent downwardly at its inner peripheral section to form a cylindrical projection 162 extending into the central hole 20 of the upper-most heat transmission plate 18. The central hole 20 is defined by the generally frustoconical inner flange 24 of the upper-most heat transmission plate 18. The upper end plate cylindrical section 162 is generally perpendicular to the major flat plate section 96a of the upper end plate 96. The lower annular end of the cylindrical section 162 is brought into tight contact with the annular end of the heat transmission plate inner flange 24, so that an annular space 164 having a triangular cross-section is formed between the end plate 96 and the upper-most heat transmission plate 18. A metallic ring 166 having a circular cross-section is disposed within the annular space 164 in such a manner as to surround the upper end plate cylindrical section 162. Additionally, the annular space 164 is filled with brazing metal 168.

Figure 25:
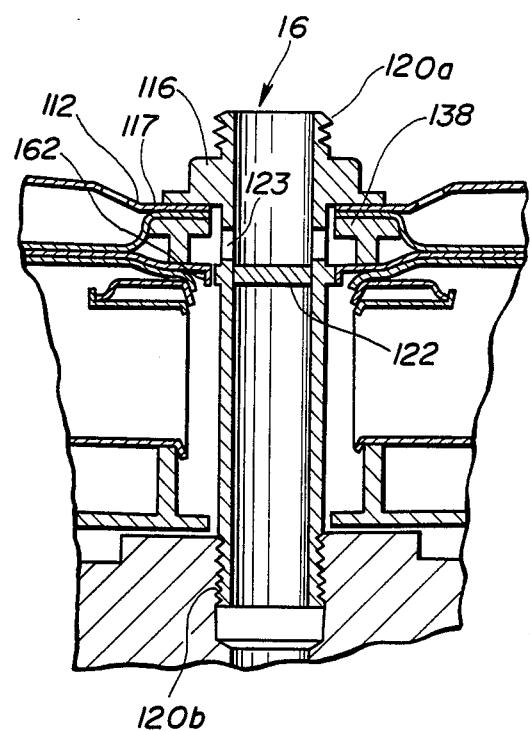
FIG. 25 is a fragmentary view illustrating the advantage of the arrangement of FIG. 24.

During brazing in which the assembled heat exchanger 10 is maintained at an elevated temperature in a heating furnace, the molten brazing metal 168 can be effectively supported in position under surface tension developed in connection with the metallic ring 166, so that the molten brazing metal 168 is prevented from dropping downwardly out of the the annular space 164. The solidified brazing metal 168 and the metallic ring 166 reinforces the inner peripheral section of the upper end plate 96 thereby to form a high rigidity section. Therefore, even when a high compressive force is applied from the connector pipe 16 through the reinforcement member 138 (shown in FIG. 20) to the inner peripheral section of the upper end plate 96 during installation of the heat exchanger 10, the upper end plate inner peripheral section is prevented from deformation as illustrated in FIG. 25.

Figure 26:
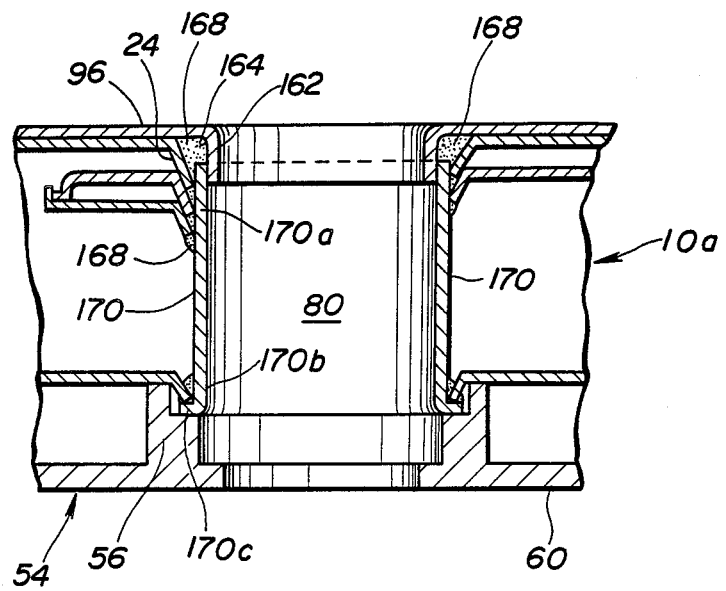
FIG. 26 is an enlarged fragmentary sectional view of an essental part of a seventh embodiment of the heat exchanger in accordance with the present invention.
Figure 27:
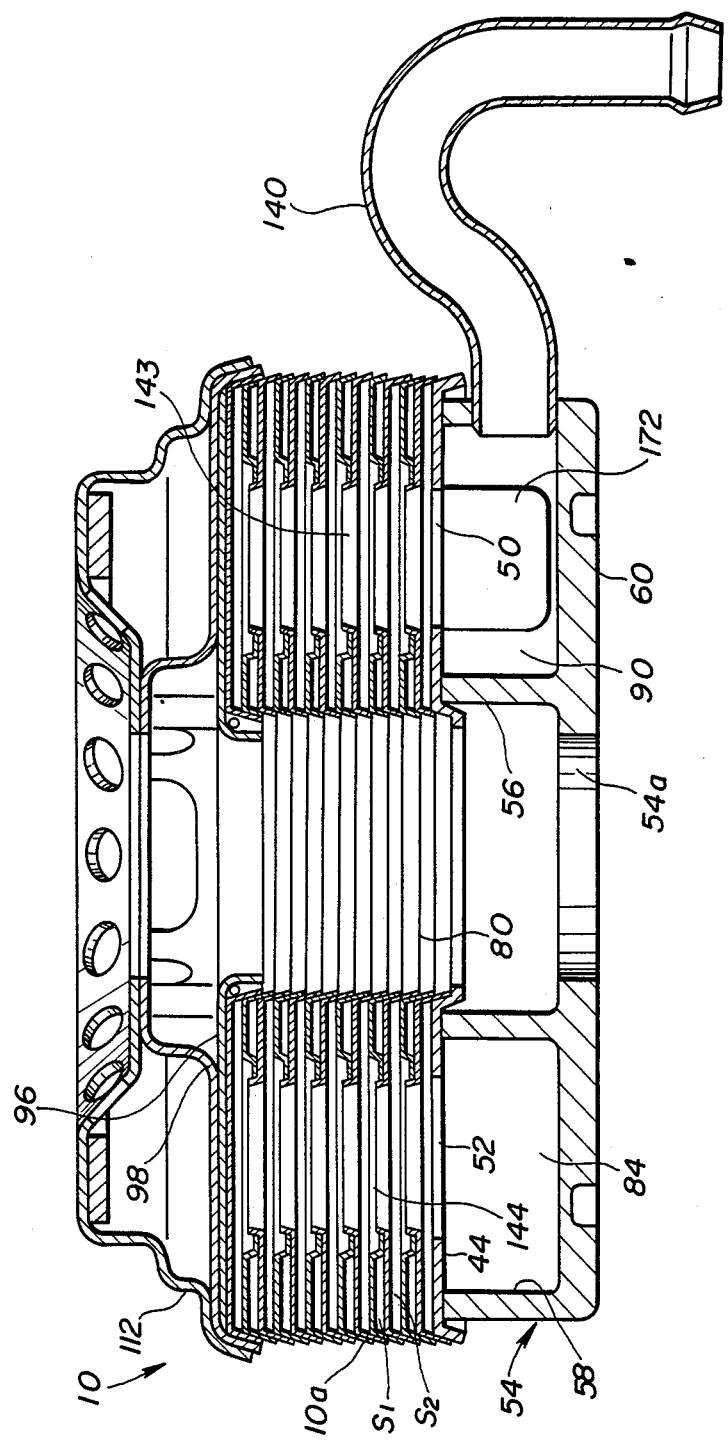
FIG. 27 is a vertical sectional view similar to FIG. 22 but showing an eighth embodiment of the heat exchanger in accordance with the present invention.
Figure 28:
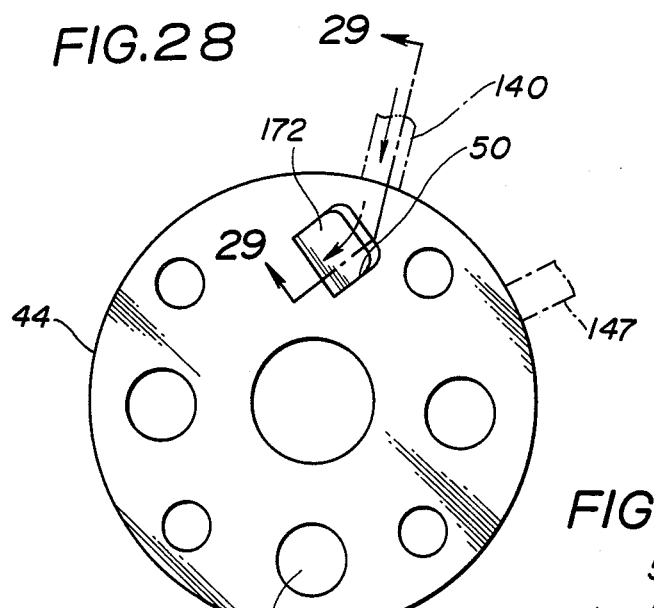
FIG. 28 is a plan view of a lower end plate of the heat exchange element of the heat exchanger of FIG. 27.
Figure 29:
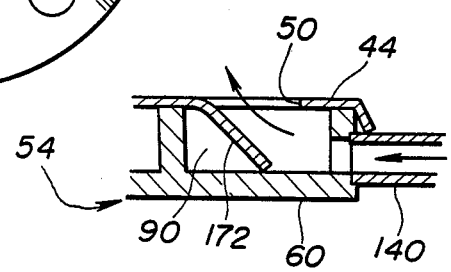
FIG. 29 is an enlarged fragmentary sectional view taken in the direction of arrows substantially along the line 29—29 of FIG. 28.
Figure 30:
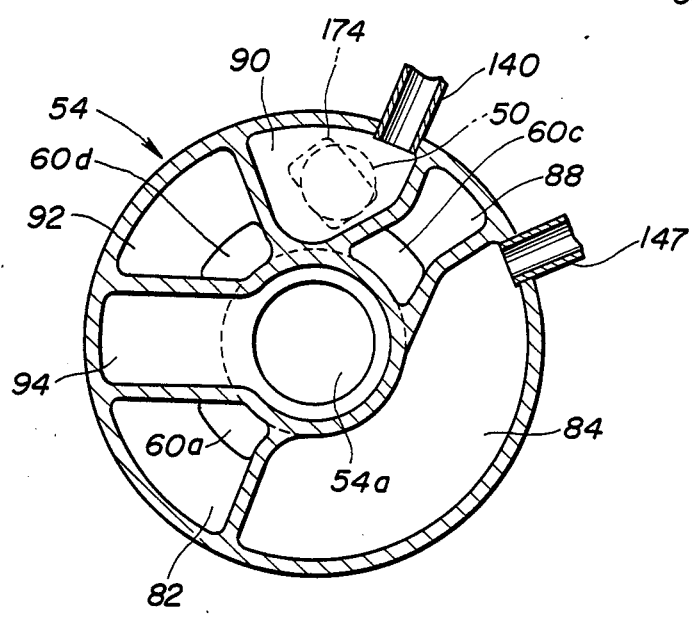
FIG. 30 is a transverse sectional view of the under cover of the heat exchanger of FIG. 27.

FIG. 26 shows an essential part of a seventh embodiment of the heat exchanger 10 in accordance with the present invention, similar to the sixth embodiment with the exception that a metallic cylindrical sleeve 170 is used in place of the metallic ring 166 of the sixth embodiment. In this embodiment, the upper annular end section 170a of the sleeve 170 is put between the lower annular end of the upper end plate cylindrical section 162 and the lower annular end of the upper-most heat transmission plate inner flange 24 and inserted into the annular space 164. The lower annular end section 170b of the sleeve 17 is formed with a radially outwardly extending annular flange 170c which is brought into engagement with the annular flat step portion 56a of the inner cylindrical wall section or boss section 56 of the under cover 54. The sleeve 170 is fixedly secured at its outer surface with the inner flanges 24 of the piled heat transmission plates 18 with brazing metal 168. In this embodiment, the molten brazing metal 168 within the annular space 164 is prevented from downward dropping under surface tension developed in connection with the upper end section 170a of the sleeve 170. In this embodiment, since the sleeve 170 extends downwardly to be brought into engagement with the under cover 54, compressive force applied to the upper end plate 96 during tightening of the connector pipe 16 is effectively dispersed and softened, thereby providing a further improved deformation suppression effect to the upper end plate 96.

FIGS. 27 to 30 illustrate an eighth embodiment of the heat exchanger 10 according to the present invention, similar to the fourth embodiment of FIGS. 17 to 22. In this embodiment, the heat exchanger element 10a is provided with the lower closure plate or lower end plate 44 which is fixedly secured to the lower-most heat transmission plate 18 like in other embodiments. The lower end plate 44 is formed with the water inlet opening 50 through which the water introduction chamber 84 communicates with the water inflow passage 134 formed in the heat exchange element 10a. A louver board-like deflector plate 172 extends downwardly from the lower end plate 44 at a peripheral portion of the water inlet opening 50 thereby to form a sloping surface 172a which is so inclined that water introduced into the under cover water introduction chamber 84 is smoothly guided upwardly into the water inlet opening 50 of the lower end plate 44. The deflector plate 172 is formed by bending downwardly a cut section (corresponding to the water inlet opening 50) of the lower end plate 44. As shown, the lower end of the deflector plate 172 is brought into contact with the bottom plate section 60 of the under cover 54. It will be understood that the deflector plate 172 is located in such a manner that its sloping surface 172a generally faces the opening of the water introduction pipe 140 through which water is supplied to the water introduction chamber 84 of the under cover 54.

By virtue of the deflector plate 172, water supplied through the water introduction pipe 140 into the under cover water introduction chamber 84 is deflected smoothly upwardly and guided along the sloping surface 172a of the deflector plate 172 to be introduced into the water inlet opening 50 of the lower end plate 44 of the heat exchange element 10a. This prevents generation of turbulence flow of water in the water introduction chamber 84, thereby suppressing pressure drop of water flow toward the heat exchange element 10a. Although the deflector plate 172 has been shown and described as being used with the fourth embodiment, it will be appreciated that the deflector plate 172 may be used in combination with other embodiments.

Figure 31:
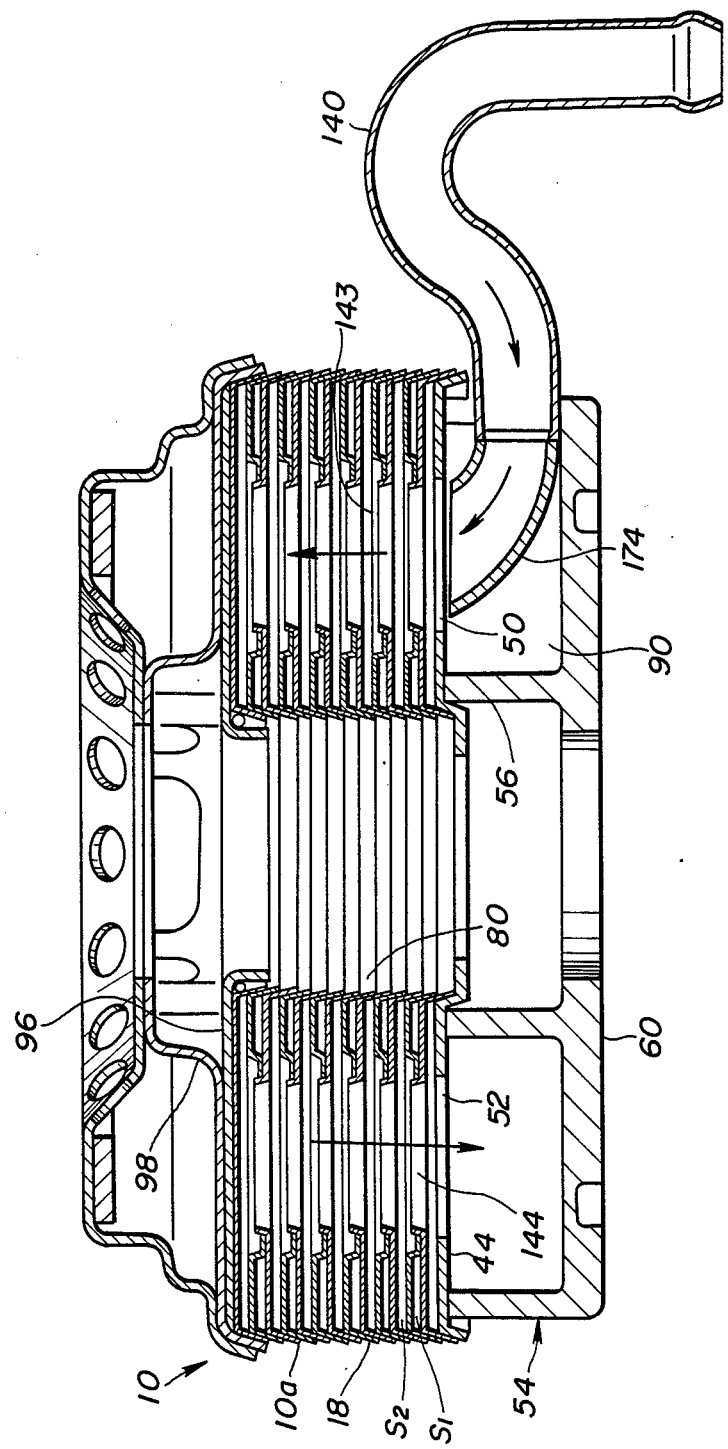
FIG. 31 is a vertical sectional view similar to FIG. 27 but showing a ninth embodiment of the heat exchanger in accordance with the present invention.
Figure 32:
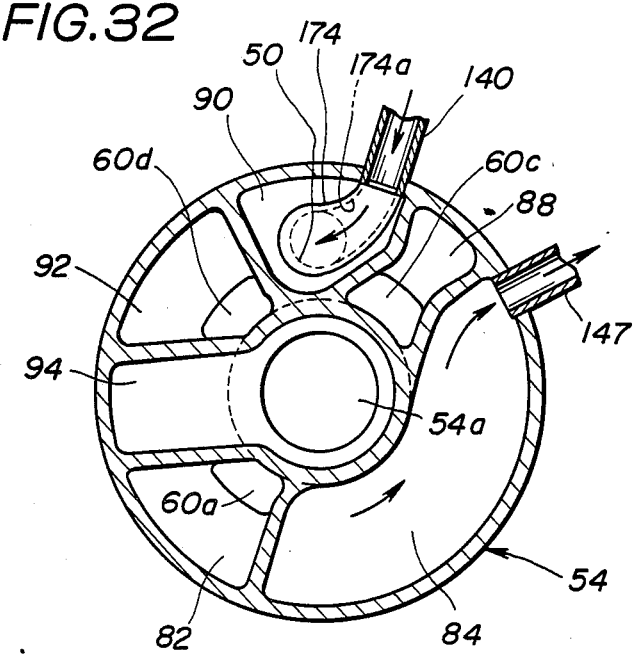
FIG. 32 is a vertical sectional view of the under cover of the heat exchanger of FIG. 31.

FIGS. 31 and 32 illustrate a ninth embodiment of the heat exchanger 10 according to the present invention, similar to the eighth embodiment of FIGS. 27 to 30 with the exception that a guide pipe 174 is used in place of the deflector plate 172. The guide pipe 174 is disposed in the water introduction chamber 84 of the under cover 54 and connected at its one end with the water introduction pipe 140. The other end of the guide pipe 174 extends to the vicinity of the water inlet opening 50 of the lower end plate 44 but is slightly separate from the lower end plate 44. As shown, the guide pipe 174 has a center axis which gradually curves so that water from the water introduction pipe 140 smoothly flows upwardly through the curved guide wall surface 174a of guide pipe 174 to be introduced into the lower end plate water inlet opening 50. The inner diameter of the guide pipe 174 gradually increases in the direction from the water introduction pipe 140 to the lower end plate water inlet opening 50, so that the water introduction pipe 140 having a smaller diameter is smoothly connected to the lower end plate water inlet opening 50 having a larger diameter.

By virtue of the guide pipe 174, water from the water introduction pipe 140 is guided smoothly upwardly along the guide wall surface 174a of the guide pipe 174 and introduced into the lower end plate water inlet opening 50 communicating with the water inflow passage 143 of the heat exchange element 10a. Accordingly, turbulent flow of water is prevented from being generated the under cover water introduction chamber 84, thereby suppressing a pressure drop of water flow toward the heat exchange element 10a.

Figure 33:
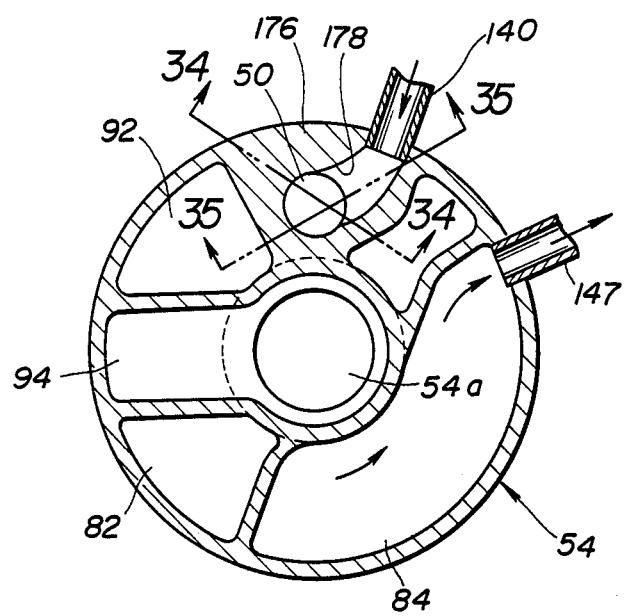
FIG. 33 is a transverse sectional view similar to FIG. 32 but showing an essential part of a tenth embodiment of the he exchanger in accordnce with the present invention.
Figure 34:
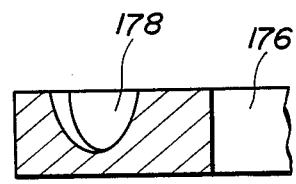
FIG. 34 is a fragmentary sectional view taken in the direction of arrows substantially along the line 34—34 of FIG. 33.
Figure 35:
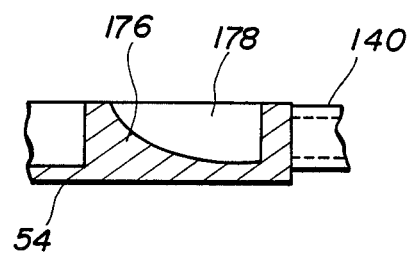
FIG. 35 is a fragmentary sectional view taken in the direction of arrows substntially along the line 35—35 of FIG. 33.

FIGS. 33 to 35 illustrate an essential part of a tenth embodiment of the heat exchanger 10 according to the present invention, similar to the ninth embodiment of FIGS. 31 and 32. In this embodiment, a part 176 (of the under cover 54) corresponding to the water introduction chamber 84 in the ninth embodiment is formed solid and formed with a curved elongate opening 178 whose surface is in the shape corresponding to the guide wall surface 174a of the guide pipe 174 in the ninth embodiment. Thus, the water introduction pipe 140 is connected through the curved elongate opening 178 with the water inlet opening 50 of the lower end plate 44 of the heat exchange element 10a. Accordingly, water from the water introduction pipe 140 is smoothly guided into the water inflow passage 143 formed in the heat exchange element 10a, suppressing a pressure drop of water flow through the under cover 54.

What is claimed is:

1. A heat exchanger for first and second fluids, comprising:
   a heat exchange element including a plurality of heat transmission plates disposed one upon another, means for securely connecting said heat transmission plates to define a first fluid flowing space and a second fluid flowing space on opposite sides of each heat transmission plate, the first fluid flowing through said first fluid flowing space, the second fluid flowing through said second fluid flowing space, and means defining a first fluid passage communicating with said first fluid flowing space, and second and third fluid passages communicating with said second fluid flowing space;
   a generally cup-shaped one-piece cover fixedly secured to said heat exchange element and said cover defining a first chamber communicating with said first fluid passage in said heat exchange element, and second and third chambers communicating respectively with said second and third fluid passages in said heat exchange element, each of said first, second and third chambers communicating with outside of said cover; and
   means for securely fixing said heat exchange element to a mount member on which said heat exchanger is mounted, in a manner that said cover is interposed between said heat exchange element and the mount member, said fixing means including means for pressing said cover into said mount member.

2. A that exchanger as claimed in claim 1, wherein said heat transmission plates include first and second heat transmission plates which are adjacent to each other, each heat transmission plate including means defining a plurality of openings, said openings corresponding to said first, second, and third fluid passages, said opening defining means each including at least one annular flange protruding from each heat transmission plate, each annular flange of said first heat transmission plate contacting with said second heat transmission plate.

3. A heat exchanger as claimed in claim 2, wherein said first, second and third fluid passages extend parallelly along an axis of said heat exchange element, wherein said heat exchange element having first and second ends to which said heat exchange element axis is perpendicular.

4. A heat exchanger as claimed in claim 3, wherein said cover is fixedly secured to said heat exchange element, first end, wherein said cover includes an outer wall section, and a plurality of partition wall sections integral with said outer wall section, each partition wall extending parallel with said heat exchange element axis.

5. A heat exchanger as claimed in claim 4, wherein each heat transmission plate is generally annular and said heat exchange element is generally cylindrical and has defined therein a central opening through which heat exchange element axis passes.

6. A heat exchanger as claimed in claim 5, wherein said heat exchange element includes a first end plate fixedly secured to said heat transmission plate and corresponding to said first end of said heat exchange element, and a second end plate fixedly secured to said heat transmission plate and corresponding to said second end of said heat exchange element.

7. A heat exchanger as a claimed in claim 6, wherein said cover is annular and generally cup-shaped, said cover including inner and outer cylindrical wall sections fixedly secured to said first end plate, said partition walls being disposed between said inner and outer cylindrical wall sections and fixedly secured to said first end plate, said inner cylindrical wall section defining a central hole coaxial with said central opening of said heat exchange element, a connector pipe being to be disposed within said cover central hole and said heat exchange element central opening and secured to a base member on which said cover is mounted.

8. A heat exchanger as claimed in claim 7, wherein said second end plate has a cylindrical section defining a central hole in which the connector pipe being to be disposed, said cylindrical section being perpendicular to a flat plate section of said second end plate, wherein said heat transmission plate fixedly secured to said second end plate has a generally frusto-conical flange defining a central hole corresponding to said heat exchange element center opening, wherein said heat exchanger further comprises means defining an annular space between said second end plate cylindrical section and said heat transmission plate, an annular metallic member in said annular space, and brazing metal filled in said annular space.

9. A heat exchanger as claimed in claim 7, wherein said cover includes means defining a fluid inlet opening in said cover outer cylindrical wall section, said fluid inlet opening communicating with said second chamber, the second fluid flowing through said fluid inlet opening to said second chamber.

10. A heat exchanger as claimed in claim 9, further comprising means for flowing the second fluid from said fluid inlet opening smoothly flow into said second fluid passage of said heat exchange element through a fluid inlet hole of said first end plate.

11. A heat exchanger as claimed in claim 10, wherein said allowing means includes a deflector plate disposed in said second chamber of said cover, said deflector plate being inclined to extend in direction from said first end plate to bottom surface of said cover.

12. A heat exchanger as claimed in claim 10, wherein said allowing means includes means defining an elongate opening extending from said cover fluid inlet opening toward said first end plate fluid inlet hole, axis of said elongate opening gradually curving.

13. A heat exchanger as claimed in claim 12, wherein said elongate opening defining means includes a pipe communicating with said cover fluid inlet opening and extending toward said first end plate fluid inlet hole, axis of said pipe gradually curving.

14. A heat exchanger as claimed in claim 12, wherein a part of said cover corresponding to said cover second chamber is formed solid with material of said cover, said part being formed with an elongate opening whose axis gradually curves.

15. An oil cooler used in combination with an oil filter, comprising:

a heat exchange element having a first end, and a second end to which the oil filter is mounted, said heat exchange element including a plurality of heat transmission plates disposed one upon another, means for securely connecting said heat transmission plates to define an oil flowing space and a coolant flowing space on opposite sides of each heat transmission plate, oil flowing through said oil flowing space, coolant flowing through said coolant flowing space, and means defining at least one oil supply passage communicating with the oil filter to supply oil to the oil filter, an oil inflow passage communicating with said oil flowing space and communicating with the oil filter to receive oil from the oil filter, an oil outflow passage communicating with said oil flowing space to receive oil from said oil flowing space, a coolant inflow passage communicating with said coolant flowing space, and a coolant outflow passage communicating with said coolant flowing space to receive coolant from said coolant flowing space; and a generally cup-shaped one-piece cover fixedly secured to the first end of said heat exchange element and including a plurality of partition walls defining at least one oil supply chamber communicating with said oil supply passage of said heat exchange element and communicating with outside of said cover, an oil discharge chamber communicating with said oil outflow passage of said heat exchange element to receive oil from said oil outflow passage and communicating with outside of said cover, a coolant introduction passage communicating with said coolant inflow passage of said heat exchange element and communicating with outside of said cover, and a coolant discharge chamber communicating with said coolant outflow passage of said heat exchange element to receive coolant from said coolant outflow passage, each partition wall extending perpendicular relative to each heat transmission plate and fixedly secured to the first end of said heat exchange element.

16. A heat exchanger for first and second fluids, comprising:

a generally cylindrical heat exchange element including a plurality of heat transmission plates disposed one upon another, means for securely connecting said heat transmission plates to define a first fluid flowing space and a second fluid flowing space on opposite sides of each heat transmission plate, the first fluid flowing through said first fluid flowing space, the second fluid flowing through said second fluid flowing space, and means defining a first fluid passing communicating with said first fluid flowing space, and second and third fluid passages communicating with said second fluid flowing space;

a generally cup-shaped one-piece cover fixedly secured to said heat exchange element and said cover defining a first chamber communicating with said first fluid passage in said heat exchange element, and second and third chambers communicating respectively with said second and third fluid passages in said heat exchange element, each of said first, second and third chambers communicating with outside of said cover;

means for defining an axial hole in said heat exchange element, said axial hole being fluidly separate from said first and second fluid flowing spaces and said first, second and third fluid passages;

means for defining a hole through a wall of said cover; and a connector bolt secured to said heat exchange element and disposed extending through said axial hole of said cover and said hole of said cover, said connector bolt being engageable with a mount member on which said heat exchanger is mounted, in a manner that said cover is interposed between said heat exchanger element and the mount member so as to be pressed onto the mount member.

* * * * *